(No Model.)
A. J. MOXHAM.
CLAMP FOR HOLDING ARTICLES WHILE BEING WELDED.
No. 508,037. Patented Nov. 7, 1893.
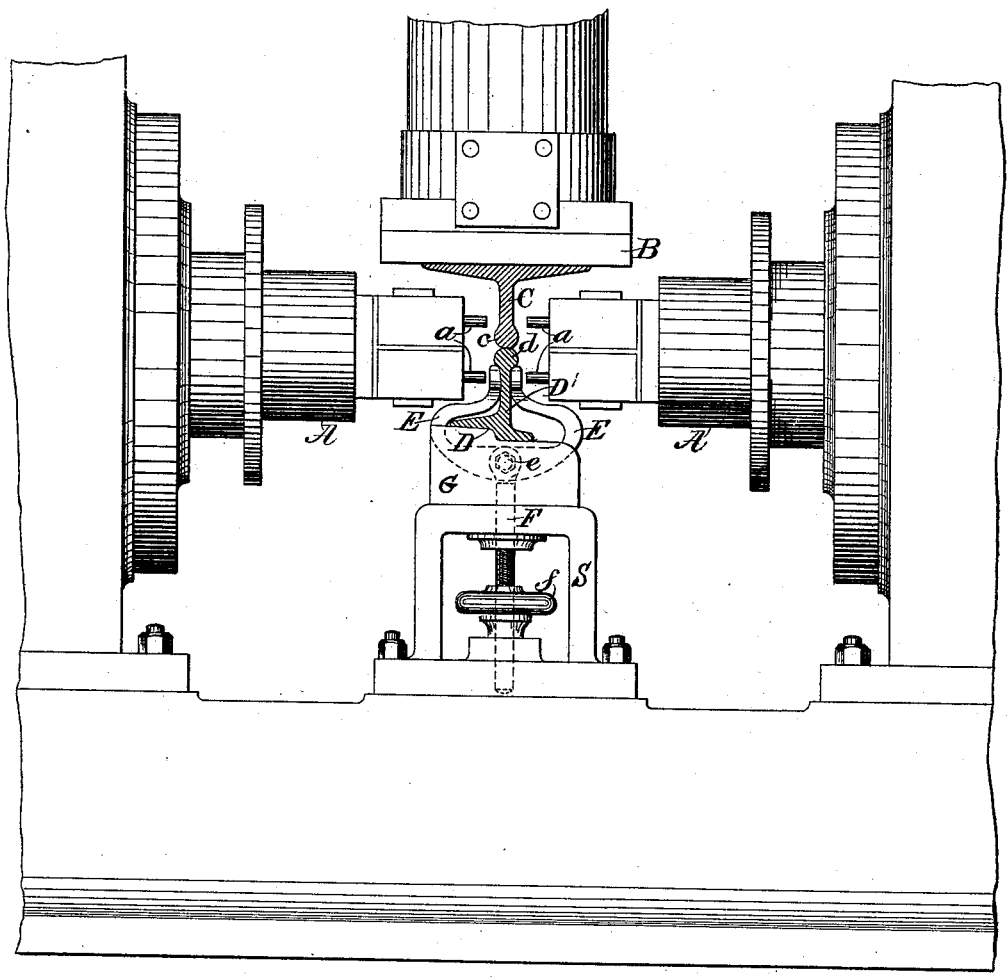
WITNESSES:
INVENTOR
BY
ATTORNEY.

UNITED STATES PATENT OFFICE.

ARTHUR J. MOXHAM, OF JOHNSTOWN, PENNSYLVANIA.

CLAMP FOR HOLDING ARTICLES WHILE BEING WELDED.

SPECIFICATION forming part of Letters Patent No. 508,037, dated November 7, 1893.

Application filed February 2, 1892. Serial No. 420,091. (No model.)

*To all whom it may concern:*

Be it known that I, ARTHUR J. MOXHAM, of Johnstown, in the county of Cambria and State of Pennsylvania, have invented a new and useful Method of and Device for Holding Articles while being Welded, which invention is fully set forth and illustrated in the following specification and accompanying drawing.

In the welding of two pieces of metal together when the point of union is on an edge the passage of the current creates the welding zone at the point of union. On the pressure being applied to bring the two edges together the heated portion of the two pieces flows away from the pressure, bulges out sidewise and downward. By supporting the heated portion against change or flow while under pressure the bulging or distortion is reduced, the piece relieved from subsequent strain and the pressure on the weld made more effective. To thus support the welding point, is the object of this invention and to that end I provide means to engage and support the rail so that the aforesaid compression does not cause extra strain on the piece and the pieces during and after the welding will consequently retain its normal length and condition.

The invention will first be described in detail in reference to welding a rail and its base or support together and then particularly set forth in the claims.

The accompanying drawing, shows in elevation so much of an electric-welding machine as is necessary to the illustration of my invention, the rail and chair to be welded being shown in cross-section and the clamps being shown in end-view in working position.

In said drawing the several parts are respectively indicated by reference letters as follows:—

The letters A, A, indicate opposing members of an electric welding machine, carrying electrodes or contact-blocks a, a.

The letter B, indicates the head of the plunger of a hydraulic press, against which plunger-head the base or flanges of the support C, bear during the welding operation. Said chair is shown as provided with a web, terminating in a bead c.

The letter D, indicates a rail placed in an inverted position upon an anvil-block or die G, mounted upon a standard S. Said rail is provided with a web D' and a bead d. The beads c and d, are usually of about the same diameter and the two metallic pieces are welded together at these beads.

In the welding process, when the metal has been sufficiently heated by the electrodes a, the rail D and support C are pressed together by means of the plunger-head B, the face of the rail heretofore having been entirely supported by a stationary block or bearing such as G. Instead of thus entirely supporting the rail against the action of the hydraulic ram, I provide the clamp jaws E, E, the free ends of which are adapted to grasp the web D' of the rail at its junction with the bead d, the welding point, so that any downward pressure from the plunger-head B is sustained by the ends of said clamping jaws engaging the bead d, and hence there is no tendency to compress, distort or strain this portion of the web of the rail while the rail and chair are being thus pressed together for welding. The jaws E, at their lower ends are pivoted in common at e, to a rod or standard F, the lower portion of which is screw-threaded and provided with a hand-wheel-nut f. By manipulating the nut f, the rod F, may be raised or lowered to adjust the clamping jaws E, vertically. When the downward pressure of the plunger-head B is removed, the clamping-jaws E, under the action of gravity alone, engage the rail lightly and hence do not interfere with moving the rail endwise between them. The support of the rail, directly at the welding point while subject to the pressure of the vertical plunger, is the important feature secured by this invention, by which stretch or distortion is prevented during this period. While therefore pivoted jaws are deemed preferable, fixed supporting jaws can be used if desired, so spaced that the rail can be slid between them.

The advantages of my invention are that the piece receiving the pressure is locally supported on both sides directly at the welding point and the strain and tendency to distort which is greatest at this point are thus directly restrained and counteracted.

Having thus fully described my said invention, I claim—

1. The hereinbefore described method of welding two pieces of metal, which consists in providing the pieces to be welded with a bead at the welding point, highly heating said beads, applying pressure to force said pieces together when highly heated, and supporting one or both of said pieces at the bead or beads in the line of said pressure by means of a clamp or clamps at the rear of said bead or beads substantially as described.

2. The hereinbefore described method of welding two pieces of metal which consists in providing the pieces to be welded with a bead, passing an electrical current through said bead, applying pressure to force said pieces together and supporting one or both of said pieces at said bead or beads in the line of said pressure by means of a clamp or clamps at the rear of said bead or beads substantially as described.

3. The hereinbefore described method of welding a rail and its base or support together which consists in forming the rail or support at the welding point with projecting portions, highly heating the rail and support at the welding point and applying pressure to force said pieces together while supporting the piece having the projecting portions directly at said portions in the line of said pressure by means of clamps at the rear of said projecting portions substantially as described.

4. The hereinbefore described method of welding a rail and its base or support together which consists in forming the rail and support at the welding point with projecting portions, heating the rail and support at the welding point and applying pressure to force said pieces together, while supporting one of the pieces being welded directly at said projecting portions in the line of pressure by means of clamps at the rear of said projecting portions substantially as described.

5. The hereinbefore described method of welding a rail and its base or support together which consists in providing said rail and support with beads, heating said beads, applying pressure to force said pieces together and directly supporting said beads in the line of the pressure by means of clamps at the rear of said beads substantially as described.

6. In a welding machine, the combination with a pressure plunger of a clamp provided with gravity jaws secured to said machine and adapted to engage or support the articles to be welded at the welding point.

7. In a welding machine the combination with a pressure plunger of a clamp consisting of two jaws, said jaws being adapted to engage and support the articles to be welded at the welding point and adjustable rod or standard to which said jaws are hinged or pivoted.

8. In a welding machine the combination with a pressure plunger of a clamping device, consisting of two curved jaws, said jaws being adapted to engage and support the articles to be welded at the welding point, a screw-threaded rod to which said jaws are pivoted and an adjusting nut.

9. A welding clamp consisting of two jaws adapted to embrace the piece to be welded at the welding point, said jaws being pivoted or hinged to an adjustable rod or standard.

10. A welding clamp consisting of two jaws, adapted to embrace the web and engage the bead of a rail, said jaws being pivoted or hinged to an adjustable rod or standard.

11. A clamping device for welding machines, consisting of two curved jaws pivoted to a screw threaded rod, and an adjusting nut for adjusting said clamps vertically.

ARTHUR J. MOXHAM.

Witnesses:
JNO. MASTERTON,
W. McLAIN.